6883X
J. DEATS.
Plow.
Patented Dec. 28, 1831.
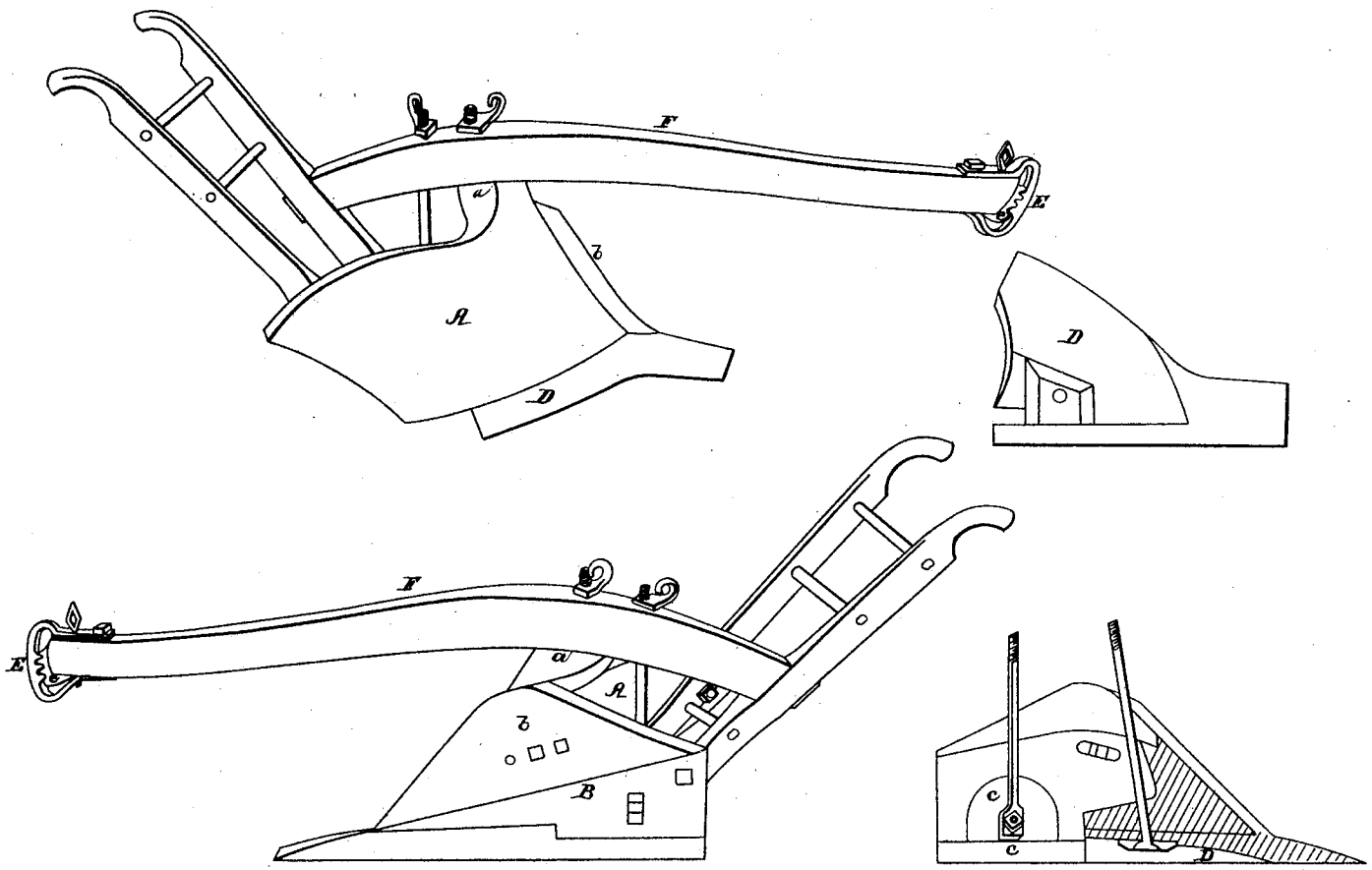
THE NORRIS PETERS CO., PHOTO-LITHO., WASHINGTON, D. C.

6883X

United States Patent Office.

JOHN DEATS, OF ROXBURY, NEW JERSEY.

IMPROVEMENT IN PLOWS.

Specification forming part of Letters Patent dated December 28, 1831.

*To all whom it may concern:*

Be it known that I, John Deats, of Roxbury, in the county of Warren and State of New Jersey, have made an Improvement in Plows, which is described as follows:

The beam and handles of this plow are made in the usual manner.

The improvements are principally in, first, the mold-board; second, the main landside; third, the bottom landside; fourth, the cutter; fifth, the share; sixth, the plate of iron under the share; seventh, the clevis.

First. The mold-board is formed of such a curvature as to turn the sward with the least resistance, and has a dovetailed groove along its front edge to receive the main landside, which comes in front of the mold-board. The sheth forms part of the mold-board and turns off from the land to prevent the plow choking, having a tenon on top, which lets into the under side of the beam a small distance, a dovetailed groove on its inner side to receive the cutter, likewise a round opening through it to admit the main bolt. A piece of cast-iron extends back a short distance from the lower front end of the mold-board, through which is a round aperture to admit the main bolt, which passes through from the bottom of the share to the top of the beam in front of the tenon of the sheth, where it is secured by a nut. The inner end of the before-mentioned projecting piece of cast-iron is formed into a semicylindrical cavity, and there being a corresponding cavity on the end of a similar projecting piece of cast-iron from the landside, when brought together form a cylindrical aperture into which a wedge is driven that secures the main landside and mold-board firmly together. A piece of cast-iron is secured to the hinder part of the mold-board, through which is made an opening to admit a screw-bolt with a square head, countersunk on the smooth side of the mold-board, the other end being secured to the tail-piece of the share.

Second. The main landside is constructed with a projection on its front edge corresponding to the dovetailed groove near the front edge of the mold-board, into which it nicely fits and is secured by the wedge in the manner before mentioned. The top of the landside runs obliquely and has a groove to receive the cutter secured by dovetails and screw-bolts. A tenon or projecting piece is formed on the lower side of the landside, near the middle, which fits into a space in the hind end of the share. A semicircular groove is formed on the inside of the landside to receive the semicircular tenon of the bottom landside. In the center of this groove is an oblong mortise for a screw-bolt.

Third. The bottom landside is an oblong piece of cast-iron, having a semicircular tenon projecting from its center, fitting into the semicircular groove in the landside, before mentioned. It is secured to the main landside by a screw-bolt and nut, and can be raised or lowered at pleasure, so as to give the plow greater or less pitch by a regulating-bolt running from near the center of the tenon to the top of the beam, where there is a nut to regulate it. This landside, when worn away on one side, can be reversed. Its bottom extends to the extreme end of the main landside, and has two shoulders, either of which will be even with the outside of the main landside.

Fourth. The cutter, which is fitted into the groove, already mentioned in the description of the main landside, dispenses with the necessity of a colter. It has two edges alike, which may be reversed when either is worn out. It may be made of cast or wrought iron, and as it wears away can be moved forward by a screw-bolt and a number of regulating-holes made in the cutter. When formed of cast-iron it is confined in the groove in the main landside by dovetails and screw-bolt. It also serves as a plate on the upper part of the landside.

Fifth. The share has an ear or projecting piece at its hind end, turned upward, with a round opening through it for a screw-bolt and nut, which secure it to the mold-board, as before mentioned. This, the tenon and space into which it is fitted, and its other fixtures serve to prevent its turning or getting out of place. Near its center is a round opening for the main bolt.

Sixth. The plate of iron under the share has a countersunk opening for the head of the main bolt, and serves to strengthen the share on the landside-wing and front parts.

Seventh. The clevis is made of wrought-iron, with three or more teeth running horizontally. In the end of the beam is a dovetailed mortise, in which is inserted a dovetailed piece of cast-iron projecting a little below the lower side of the beam, and being flush with it on top, having four or more notches in front at right angles to those in the clevis, and into which the middle teeth of the latter are inserted to regulate the cutting of the plow.

Further to illustrate my invention, I refer to the model and drawings of the same deposited in the Patent Office.

What I claim as my invention, and wish to secure by Letters Patent, is—

The before-described improvements in the mold-board, the main landside, the bottom landside, the cutter, the projection or ear on the share and space in the same at the heel, the plate of iron under the share, and the dovetail piece of cast-iron in the end of the beam.

In testimony whereof I have hereunto subscribed my name, in presence of two witnesses, this 19th day of December, 1831.

JOHN DEATS.

Witnesses:
JOSEPH BIRKETT,
JOHN YOUNG.